(12) United States Patent
Gleixner

(10) Patent No.: US 6,504,361 B1
(45) Date of Patent: Jan. 7, 2003

(54) INDUCTIVE MEASUREMENT TRANSDUCER FOR DETERMINING A POSITION OF A MOVING BODY

(75) Inventor: Franz Xaver Josef Gleixner, Röhrmoos (DE)

(73) Assignee: Horst Siedle GmbH & Co. KG, Furtwangen (DE)

( * ) Notice: Subject to any disclaimer, the term of this patent is extended or adjusted under 35 U.S.C. 154(b) by 0 days.

(21) Appl. No.: 09/582,275
(22) PCT Filed: Dec. 21, 1998
(86) PCT No.: PCT/DE98/03753
§ 371 (c)(1),
(2), (4) Date: Jun. 22, 2000
(87) PCT Pub. No.: WO99/34170
PCT Pub. Date: Jul. 8, 1999

(30) Foreign Application Priority Data

Dec. 23, 1997 (DE) .......................................... 197 57 689

(51) Int. Cl.$^7$ .............................. G01B 7/14; G01B 7/30
(52) U.S. Cl. ............................ 324/207.17; 324/207.12; 324/207.25; 324/207.24
(58) Field of Search ....................... 324/207.17, 207.12, 324/207.15, 207.16, 207.24, 207.26, 207.25; 33/706, 708; 336/119, 120, 130

(56) References Cited

U.S. PATENT DOCUMENTS 5,055,814 A * 10/1991 Morimura et al. .......... 336/119
5,973,494 A 10/1999 Masreliez et al. ..... 324/207.24

FOREIGN PATENT DOCUMENTS

| DE | 2511683 | * | 9/1976 |
| DE | 3913861 | * | 11/1989 |
| EP | 760 087 | | 3/1997 |
| FR | 2 682 760 | | 4/1993 |
| WO | WO 94/03778 | * | 2/1994 |

* cited by examiner

*Primary Examiner*—Jay Patidar
(74) *Attorney, Agent, or Firm*—Cohen, Pontani, Lieberman & Pavane

(57) ABSTRACT

An inductive measurement transducer for determining a position of a moving body, comprising: a conductor loop over the moving body; a stationary conductor loop which extends over a measurement length and is fixed with respect to the moving body; an inductively acting element mounted to the moving body to produce an alternating magnetic field which extends essentially at right angles to the conductor loop over the moving body so that the alternating field passes through the stationary conductor loop, a voltage difference between a forward line and a return line of the stationary conductor loop being averaged and passed to an output so that voltage elements can be tapped off by individual taps which are distributed over the measurement length on the conductor loop; and one of individual resistors and individual capacitors operatively arranged to carry out the averaging, the one of individual resistors and individual capacitors being connected to a common connection which encloses the region through which the alternating magnetic field of the moving, inductively acting element can flow.

40 Claims, 9 Drawing Sheets

A - B

INDUCTIVE MEASUREMENT TRANSDUCER FOR DETERMINING A POSITION OF A MOVING BODY

PRIORITY CLAIM

This is a U.S. national stage of application No. PCT/DE98103753, filed on Dec. 21, 1998. Priority is claimed on that application:

Country: Germany, Application No.: 197 57 689.3, Filed: Dec. 23, 1997.

BACKGROUND OF THE INVENTION

Field of the Invention and Discussion of the Prior Art

The invention relates first of all to an inductive measurement transducer. An inductive measurement transducer has a stator and a carriage which can be moved with respect to it, having an inductive transmitter element and associated evaluation electronics, whose output signal represents a measure of the position of the carriage relative to the stator. The stator has a field coil which extends over the measurement distance and is fed with alternating current, and whose magnetic field passes through a transmitter element which is connected to the carriage and is in the form of a soft-magnetic core and/or a coil, and in turn passes through a secondary winding connected to the stator, where it induces a voltage dependent on the position of the carriage. This secondary winding consists of one turn, from which voltage elements are obtained by appropriate taps distributed over the measurement distance. The voltage elements are averaged to produce a voltage which is dependent on the position of the carriage. The averaging can be carried by resistors or else by other electrical components. Instead of discrete components, resistance layers or capacitor plates may also be used. In one particularly advantageous embodiment, the field winding consists of a single turn, with the housing and guides being used as the coil. A further improvement is obtained by designing the transmitter element as a tuned circuit, and this greatly reduces the formation of stray fields. In this case, it is advantageous for the sensor to be operated at the resonant frequency of this tuned circuit, by using the tuned circuit as the element which defines the frequency of an oscillator.

The invention furthermore relates to an arrangement for measuring angles.

The advantage of inductive distance/angle sensors is a low sensitivity to dirt and other environmental influences. Differential inductors are generally known, in which a soft-magnetic core is positioned in two coils and its position influences the inductance of the two coils such that a voltage which is dependent on the position can be tapped off between the two coils, which are connected in series and are connected to an AC voltage. This configuration has the disadvantage that the physical length of the coil amounts to at least twice the measurement distance and, furthermore, the mechanical connection of the coil also projects beyond the measurement distance in the final position, so that an installation length of at least three times the measurement distance is required. In addition, the measurement result is influenced by the temperature response of the winding resistance and the permeability of the magnet material used.

In addition, solutions have been proposed in which either short-circuit cylinders or cores of high permeability are inserted into a coil, with the change in the inductance of the coil being used as a measure of the position of the core. These solutions have the advantage over differential transformers that their physical length is shorter. However, when the measurement rod is extended, at least twice the measurement distance is still required. Furthermore, the temperature response of the winding resistance and of the core has a more pronounced effect on the temperature characteristic.

From German reference DE-A-2511683, it is known for a suitable measurement signal to be produced by injecting a voltage from a field winding via a high-permeability core into a measurement winding with an increasing turns density. This method has the advantage of a short physical length, but has the disadvantage that the distribution of the magnetic field over the area of the measurement coil and the configuration of the measurement coil are subject to stringent requirements.

Furthermore, an embodiment is known from WO 94/03778 in which a reduction in the voltage drop within part of the region of the coil is produced by means of a short-circuiting ring on a coil, and a signal which is dependent on the position of the short-circuiting ring is formed by means of resistors or capacitors from taps on the coil. This results in a sensor having a short physical length. The disadvantageous feature is the influence of the winding resistance and of the stray inductances.

SUMMARY OF THE INVENTION

The object of the invention is to overcome the disadvantages of the apparatuses mentioned above and to propose a distance sensor which can be constructed using simple means and is highly accurate.

BRIEF DESCRIPTION OF THE DRAWINGS

Preferred exemplary embodiments of the present invention are described in the following text with reference to the drawing, in which:

FIGS. 10 and 10a show an exemplary embodiment of an angle sensor having an annular coil and measurement core fitted away from the rotation point, according to the invention;

FIGS. 12 and 12a show, schematically, an angle sensor having a flat coil according to the invention.

DETAILED DESCRIPTION OF THE PREFERRED EMBODIMENTS

Figure 1:
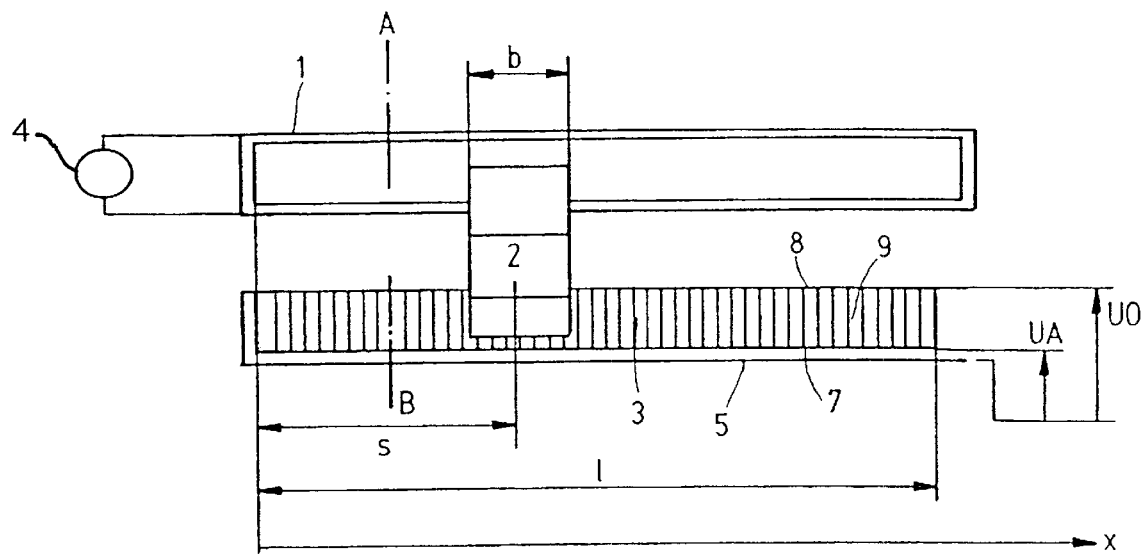
FIGS. 1 and 1a show a schematic illustration of the sensor according to the invention.
Figure 1A:
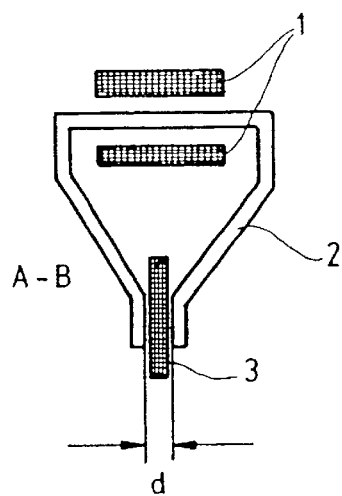

FIG. 1 shows a schematic illustration of a sensor according to the invention. A field winding 1 whose coil area extends over the length 1 of the sensor is fed from an AC voltage source 4. A coil core 2 composed of a high-permeability material and having an air gap d is guided in a moving manner such that it passes through the coil 1 and part of a voltage divider element 3 is located in its air gap. The voltage divider element 3 comprises a conductor 5 which, along the lower edge, extends beyond the voltage divider element 3, a conductor 8 which extends beyond the voltage divider element at the upper edge, a further conductor 7 which runs parallel to the conductor 5, and a conductive coating 9 which is located between the conductor 8 and the conductor 7 and forms a resistance, which is distributed over the area over the measurement distance, between the conductors 8 and 7 and which, overall, has a high impedance in comparison with the impedance of the induction loop formed by the conductors 5 and 8.

The current supplied from the AC voltage source 4 passes through the coil 1 to produce a magnetic flux which passes via the voltage divider element 3 in the region of the core 2, while only a small amount of flux passes through the rest of the voltage divider element 3.

Figure 2:
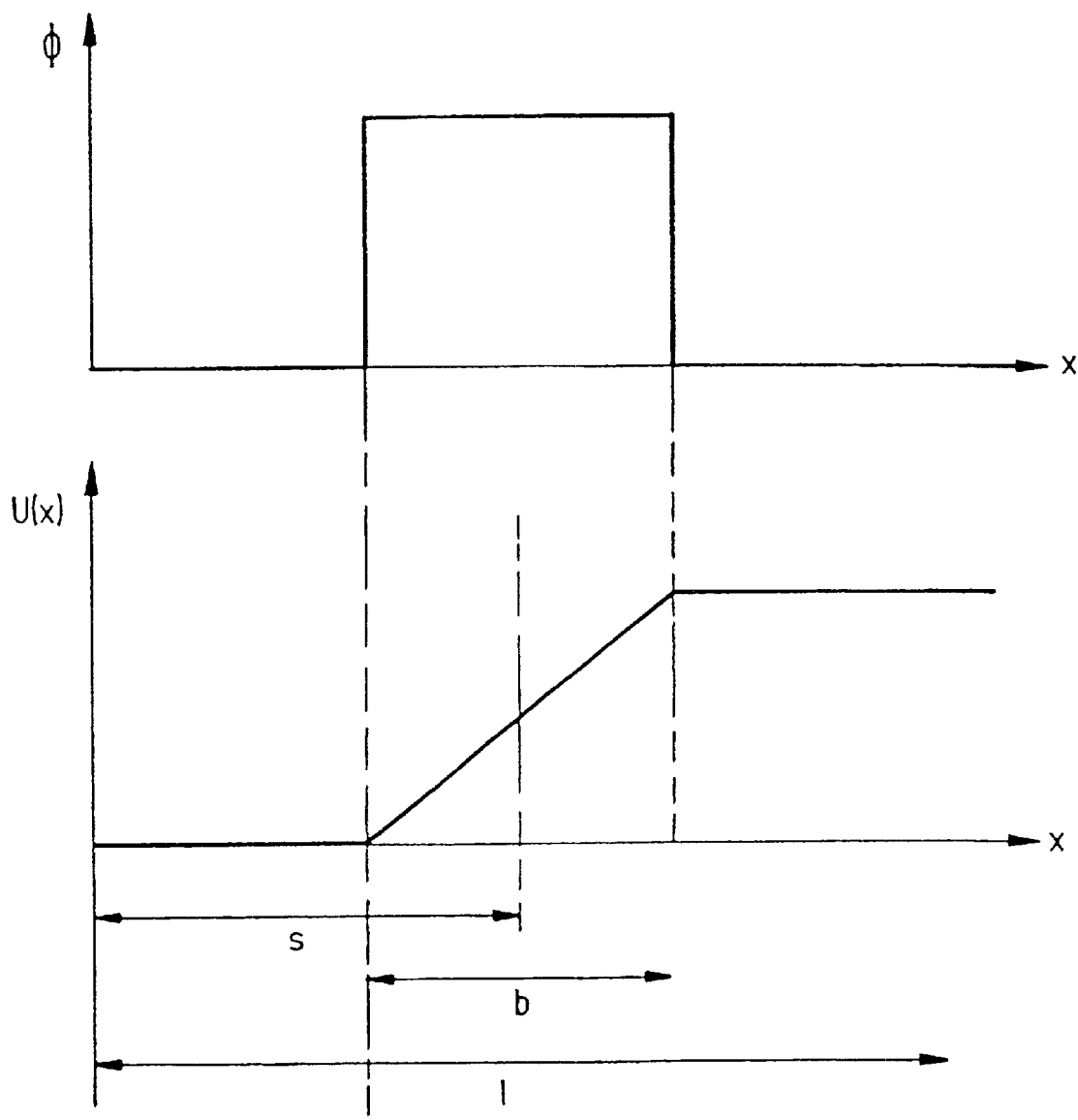
FIG. 2 shows a diagram of the magnetic flux and of the voltage profile produced by it on the measurement winding, over the length of the winding.

The diagram illustrated in FIG. 2 shows an idealized profile of the field strength and of the voltage over the length of the measurement transducer. The profile does not take account of edge effects or the stray field. A magnetic flux $\Phi$ is produced in the region of the core and passes through the resistance element 9.

The variation of the magnetic field with time in the region of the air gap of the core 2 induces an AC voltage U (x) in the conductor 8 with respect to the conductors 5 and 7. The AC voltage U (x) is proportional to the integral of the magnetic flux $\Phi$ integrated over the area. In consequence, a voltage profile is formed on the conductor 8 with respect to the conductor 5 above the position x, which is initially zero at that position opposite the connections to the core 2 and rises linearly with the area covered by the core 2, and remains constant behind the core as far as the connections (FIG. 2). The resistances which are distributed over the area over the distance 1 and are initially considered to be a resistance coating form a sum $R_0$ which can be detected at the connection of the conductor 7 with respect to the conductor 5, or the conductor 8.

If the resistance coating is regarded as being composed of individual resistors of equal magnitude which are connected in parallel and are each connected to different voltage sources, then the output voltage becomes:

$$U_A = \frac{R}{n} * \sum_{i=1}^{n} \frac{U_i}{R} = R_0 * \sum_{i=1}^{n} \frac{U_i}{R_0 * n} = \sum_{i=1}^{n} \frac{U_i}{n}$$

If n is allowed to increase to infinity, this then results in $$U_A = \frac{1}{l} * \int_{x=0}^{l} U_x dx$$

For the voltage profile shown in FIG. 2, this then results, for a region 0>s<(l-b) in an output voltage of $$U_A = U_0 * \frac{b}{2l} + U_0 * \frac{l-s-b}{l}$$

This results in a linear relationship between the position s of the moveable core 2 and the output voltage $U_a$.

The conductive coating may be formed as a continuous surface of the resistance material or may be in the form of a sufficient number of uniformly distributed discrete resistors or capacitor surfaces or individual capacitors, or combinations of them.

Since the measurement coil consists of only one turn, the output voltage is relatively low. An appropriately high magnetic flux through the voltage divider element is required to produce a signal which can be used for evaluation, in which case the stray flux from the primary coil 1 should be coupled into the voltage divider element as little as possible. The induced voltage is a function of the frequency, of the magnetic field strength produced in the primary coil 1, of the permeability and the cross section of the coil 2, of the air gap d of the core 2 and of the area of the core in the region of the air gap.

Figure 3:
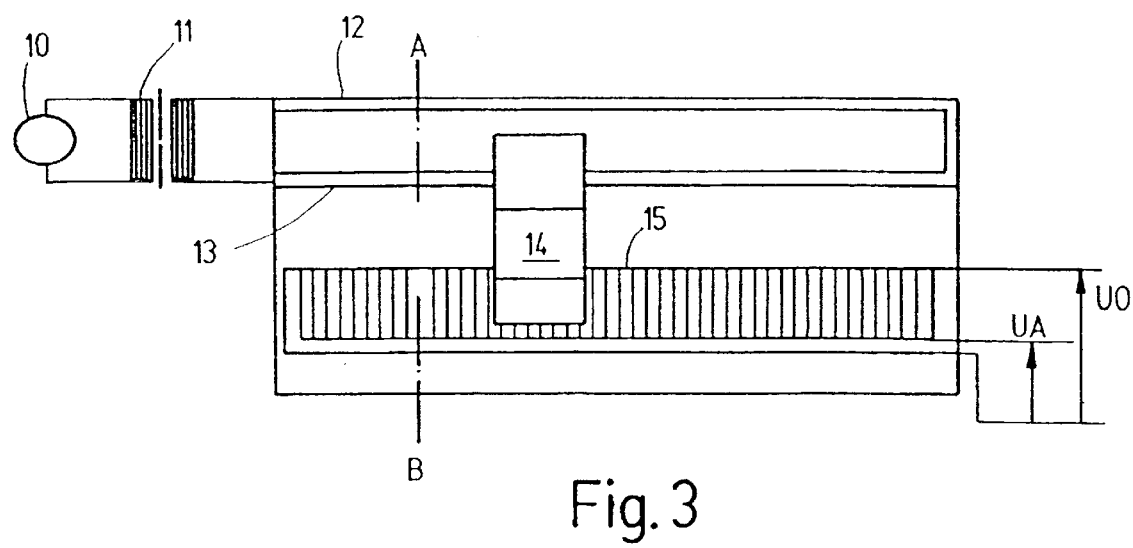
FIGS. 3 and 3a show an exemplary embodiment with a single turn as the field winding.
Figure 3A:
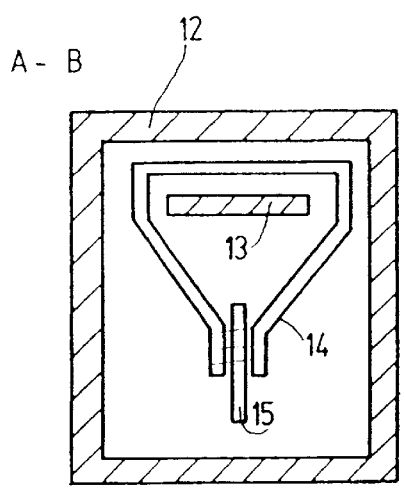

In order to produce high induction voltage with a low current flow, it is expedient to choose the frequency to be as high as possible. However, for long movement distances, the frequency is limited by the winding capacitance. Furthermore, production of a suitable coil is relatively complex and it is difficult to insert the moving core into the coil. These difficulties can be overcome by a design in which the primary coil is designed in the form of a single turn, and matching to the circuit for producing the supply voltage is provided by means of a transformer. FIG. 3 and 3a show a schematic, partially cut away, illustration of one exemplary embodiment.

The voltage supplied from the voltage source 10 is reduced by the transformer 11 to an appropriately lower voltage. One connection of the secondary winding of the transformer 11 is connected to the housing 12, and the other connection is connected to a rail 13 which is located inside the housing 12 and parallel to the inner wall, and is electrically connected to the housing 12 at the opposite end. The current in the secondary of the transformer thus flows via the rail 13 and back via the housing 12. The core 14 is located between the rail 13 and the housing 12 and causes a magnetic flux, produced by the current through the rail 13 and the housing 12, to pass through the voltage divider element 15. The return line is designed to be as broad as possible and is arranged at a short distance from the housing 12. In contrast to a normally wound coil, this arrangement offers the possibility of designing the geometry such that there is as little inductance as possible in the region outside the core 14, so that the voltage drop occurs predominantly in the region of the core 14, due to its low magnetic reluctance. This arrangement has a resonant frequency which is well above the frequency required for this arrangement.

The magnetic fields which occur in the region outside the core 14 and are produced by the field winding induce a voltage in the voltage divider, and this voltage is added to the position-dependent wanted signal induced in the core 14. Initially, this would result only in a zero-point shift. However, since the permeability of the soft-magnetic core material is dependent on the temperature, this can lead to a deterioration in the temperature response. The voltage induced in the voltage divider 15 by the stray field should thus be as small as possible.

The following measures can overcome this:

Arrangement of the voltage divider element at a sufficient distance. This method leads to a simple design, but it requires a relatively large amount of space.

Figure 4A:
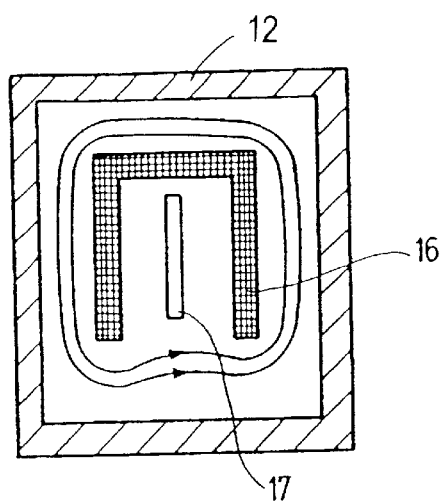
FIGS. 4a and 4b show a cross section through an exemplary embodiment in which the effect of the undesirable stray field is reduced.
Figure 4B:
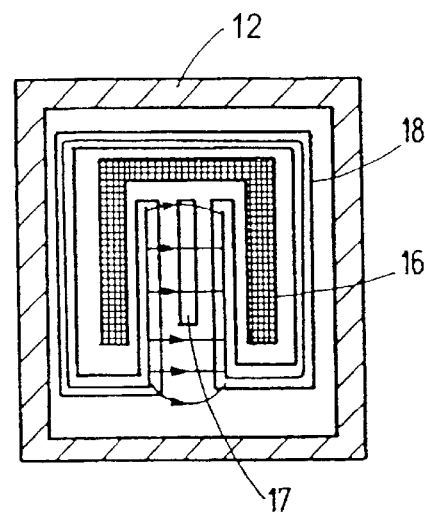

The voltage divider element 17 is moved into the region of a depression in one of the winding halves (FIGS. 4a and 4b). A design in which the field coil has only one turn is particularly suitable for this purpose. FIG. 4a and FIG. 4b show a section through a corresponding arrangement. The housing 12 is used as the forward conductor and the profile 16 as the return conductor for the field current. The profile 16 is designed such that the voltage divider element 17 can be accommodated recessed in an opening like a trench. The core 18 is composed of a material with high magnetic permeability and encloses the profile 16, having an air gap which is arranged in the trench-like opening in the profile, and in which the voltage divider element 17 is in turn located.

FIGS. 4a and 4b show the profile of the magnetic lines of force which are produced by the current which flows through the profile of the housing 12 and the profile 16 (return line). In this design, the field current preferably flows in the surface region of opposite surfaces. The region of the trench-like opening is thus largely free of any field, as long as the magnetic flux is not influenced by the core.

FIG. 4a shows the profile of the lines of force without any core. In this case, virtually no lines of force pass through the voltage divider element 17.

In FIG. 4b—in the region of the core 18—the lines of force preferably follow the core 18, owing to the high permeability of said core 18, and pass through the voltage divider element 17 predominantly in the region of the air gap, in order to induce the desired voltage there. Since the magnetic reluctance is less, the magnetic flux is higher than in the region without the core 18. Stray fields also admittedly occur here, and lead to a reduction in the output signal. However, their ratio to the wanted field is always the same.

One advantage of this arrangement is that the inductance of the primary winding in the region outside the core 18 is very low, while it is relatively high in the region of the magnet core 18. In consequence, only a low voltage drop occurs across the field winding in the region outside the measurement core. Furthermore, the structure is very stiff owing to the shape of the profile, thus creating good mechanical robustness. However, the complex design of the core 18 is a disadvantage.

Figure 5A:
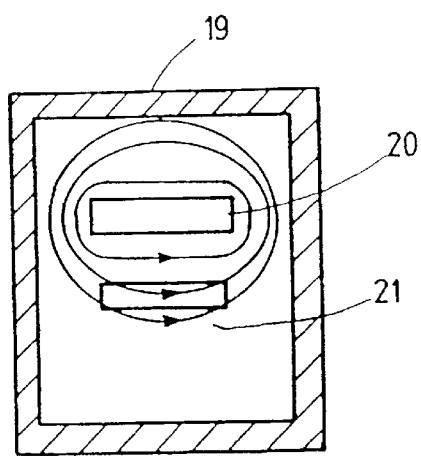
FIGS. 5a and 5b show an embodiment in which the coupling effect from the stray field is rendered ineffective by a suitable arrangement of the field winding.
Figure 5B:
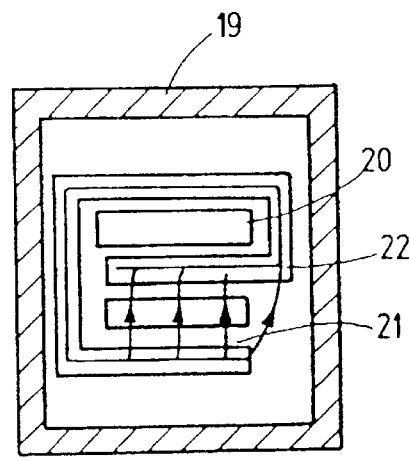

The voltage divider element is arranged so that the undesirable stray fields cancel one another out (FIG. 5a and FIG. 5b). In the housing 19, which acts as the forward conductor, the return conductors 20 are arranged with respect to the voltage divider element such that the magnetic lines of force pass through the voltage divider element when no core is present, so that the integral of the magnetic flux over the area of the voltage divider element tends to zero (FIG. 5a) where it is not formed in the region of the core 22. FIG. 5b shows the region of the core 22, where the flux is diverted such that the magnetic flux passes through the voltage divider element 21 in only one direction, and thus induces a corresponding voltage in the measurement winding.

Since the voltage divider element consists of only one turn, in which the voltage to be evaluated is induced, the output voltage is relatively low. With the physical sizes that are used, the cross sections for the core may be about 0.5 $cm^2$ with an air gap of 2 mm. An operating frequency in the region around 100 kHz and an output voltage of at least 0.1 volts are desirable. (Lower voltages admittedly give even more useable results. However, the evaluation of the output voltage is then more complex and the influence of noise becomes noticeable if the accuracy requirements are high.) The field current required for the flux can thus be estimated. This results in a value of about 5 A. This requires appropriate design of the transformer and the forward and return lines. The current can be reduced by increasing the frequency, reducing the air gap and enlarging the air gap area.

Figure 6:
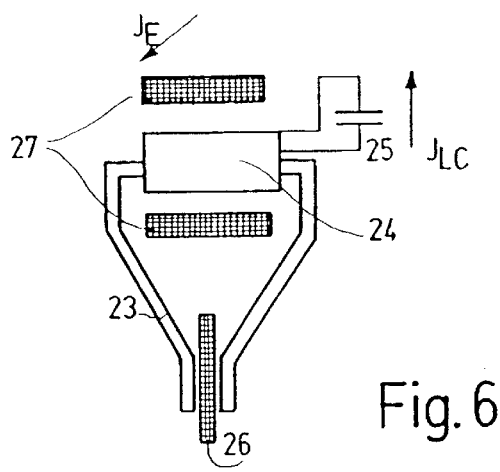
FIG. 6 shows an embodiment having a measurement core with an additional winding and a capacitor to form a tuned circuit.

Particularly with long measurement lengths, supply is complex owing to the voltage drops that occur in this case. In addition, the high supply current produces a relatively strong undesirable stray field. It is thus desirable to concentrate the field current on the region of the measurement core. This can be done as shown in FIG. 6, if the measurement core 23 is provided with a winding 24 which is connected to a capacitor 25. The inductance of the coil and the capacitance result in a tuned circuit which is energized by the field current $J_E$. The current $J_{LC}$ flows in the tuned circuit and, when multiplied by the number of turns in the coil, produces a corresponding magnetic field strength in the air gap of the core 23. If the tuned circuit is operated at its resonant frequency, only the field current $J_E$ which is needed to cover the tuned-circuit losses is required to maintain the voltage on the coil. Depending on the Q-factor of the tuned circuit, the field current can be reduced by a factor of 10 to 50.

The field current $J_E$ flows through the core via a conductor 27. The voltage induced in the measurement winding 26 is governed mainly by the current $J_{LC}$ flowing through the winding 24 and the capacitor 25. When evaluating the measurement voltage, it is still necessary to remember that the field current $J_E$ is phase-shifted through 90° with respect to the tuned-circuit current $J_{LC}$ when the tuned circuit is at resonance. This further reduces the influence of the stray field. The divier element is indicated with 26.

Figure 7:
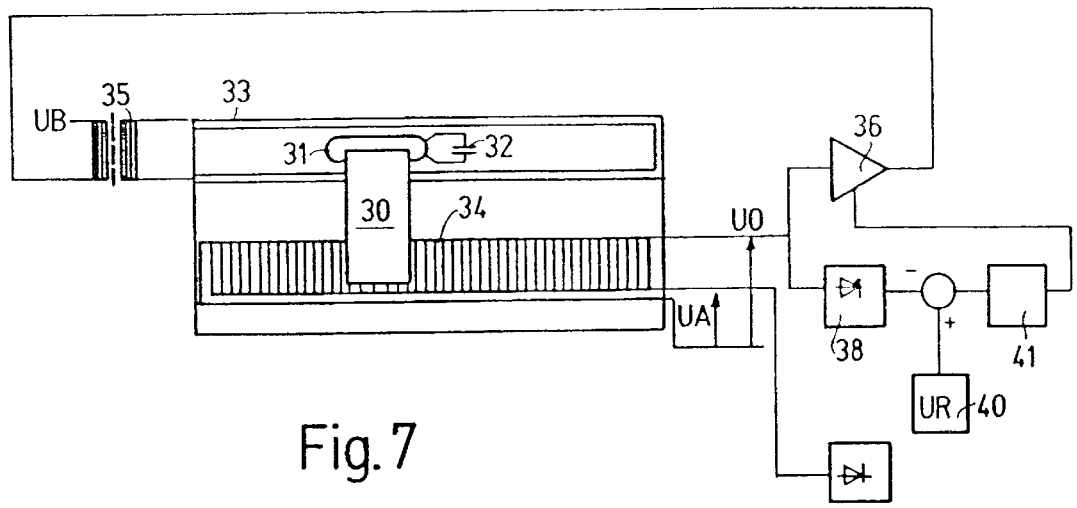
FIG. 7 shows a block diagram of a design in which the tuned circuit is used as the element which defines the frequency in an oscillator circuit.

One precondition for satisfactory operation of the tuned circuit is that it is operated at a resonant frequency. This can be done by tuning the oscillator frequency to the tuned-circuit frequency, or vice versa. This method does not prevent the oscillator and tuned circuit from being off tune with one another. It is thus expedient to use the measurement tuned circuit as the element which governs the frequency of an oscillator. FIG. 7 shows the block diagram for an arrangement which uses the tuned circuit formed from the core 30, the coil 31 and the capacitor 32 as the element which defines the frequency. By varying the magnetic flux in the measurement loop 34, the core 30 produces an induction voltage $U_O$ which is amplified by the amplifier 36 and results in a current through the primary winding of the transformer 35. The secondary winding of this transformer 35 produces a current through the field winding 33, which in turn produces flux through the core 30 of the tuned circuit. At a resonant frequency, the current and voltage are in phase, and the voltage assumes a maximum. If the gain is sufficient, the circuit oscillates at the frequency of the tuned circuit formed by the coil 31 and the capacitor 32.

The ratio of the voltages between the output of the voltage adder 41 and the entire secondary winding 34 is used as a measure of the position of the core with respect to the stator. It is expedient to regulate the voltage across the secondary winding 34 to a constant value by comparing it, after rectification by a rectifier circuit 38, with a reference voltage $U_R$ from the voltage source 40 and by using the regulator 41 to reduce the difference to zero, by adjusting the oscillator amplitude by influencing the circuit gain of the oscillator circuit such that it oscillates at the required amplitude. This method has the advantage that, provided it is suitably designed, the oscillator circuit does not limit cycle, and thus has very low harmonic content.

Figure 8:
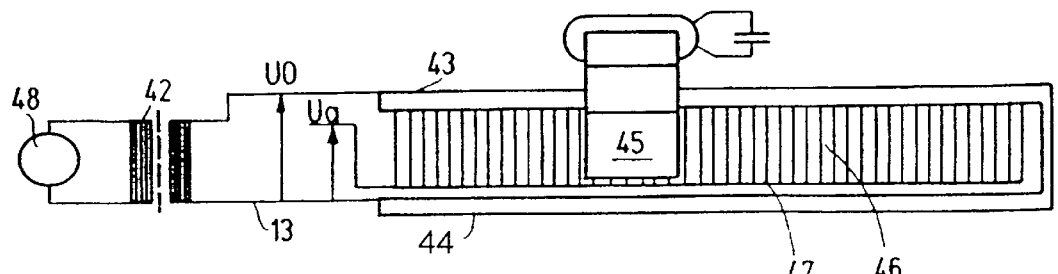
FIG. 8 shows a schematic illustration of an embodiment in which the measurement voltage is tapped directly off the field winding.

In many cases, it is advantageous for the measurement transducer to have as few connections as possible, for example if they are intended to be passed in an insulated manner through container walls. The number of connections required can be reduced if the voltage applied to the supply line is evaluated. FIG. 8 shows one example of such an embodiment. The AC voltage source 48 supplies a conductor loop, which comprises the conductors 43 and 44, via a transformer 42. One of the two conductors passes through the moveable core 45. The resistance layer 46 is connected to the conductor 43, and is connected at the opposite end to the conductor 47. The dimensions are designed such that the voltage drop along the conductor 43 is lower in the region without the core 45 than the voltage drop in the region of the core 45. In this case, it is particularly advantageous for the core 45 to be in the form of a tuned circuit, which is operated at a resonant frequency. The resistance element 46 adds the voltage profile on the conductor 43, and this is output via the conductor 47. The problem with this design is that the voltage drops on the conductors 43 and 44 caused by the supply current for the measurement transducer are included in the output voltage. This expresses itself as a shift in the zero point and a reduction in the output signal. Thus, if necessary, compensation can be provided by means of a current-dependent correction voltage.

The following text describes inductive measurement transducers in the form of angle sensors.

In the case of angle sensors, it is possible to arrange the field core to be stationary and to be supplied directly with the oscillator. There is thus no field winding and no transformer for matching to the oscillator. Depending on the measurement range and the accuracy requirement, there are various possible physical forms.

The best relates to an angle sensor having an annular coil.

An arrangement having an annular coil which is located concentrically with respect to the rotation point of the measurement shaft is particularly advantageous for measurement ranges of more than 90°. In this case, it is in turn necessary to distinguish between an arrangement having a measurement core fitted to the measurement shaft at the rotation point and a measurement core which is fitted eccentrically (away from the rotation point) and has a continuous measurement shaft (hollow shaft). A concentric annular coil is required wherever the rotation angle is unlimited.

Figure 9:
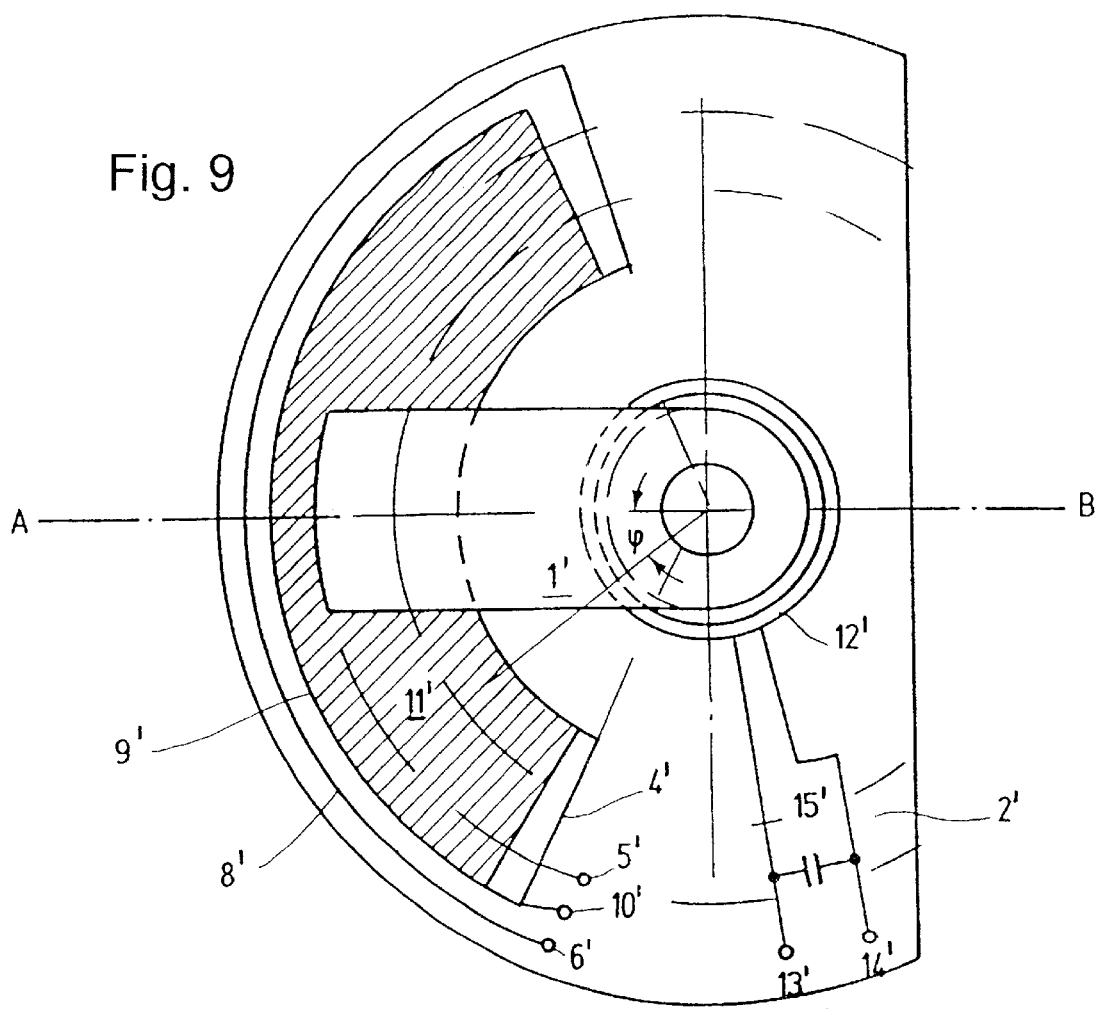
FIGS. 9 and 9a show an angle sensor having an annular coil and measurement core fitted at the rotation point, according to the invention.
Figure 9A:
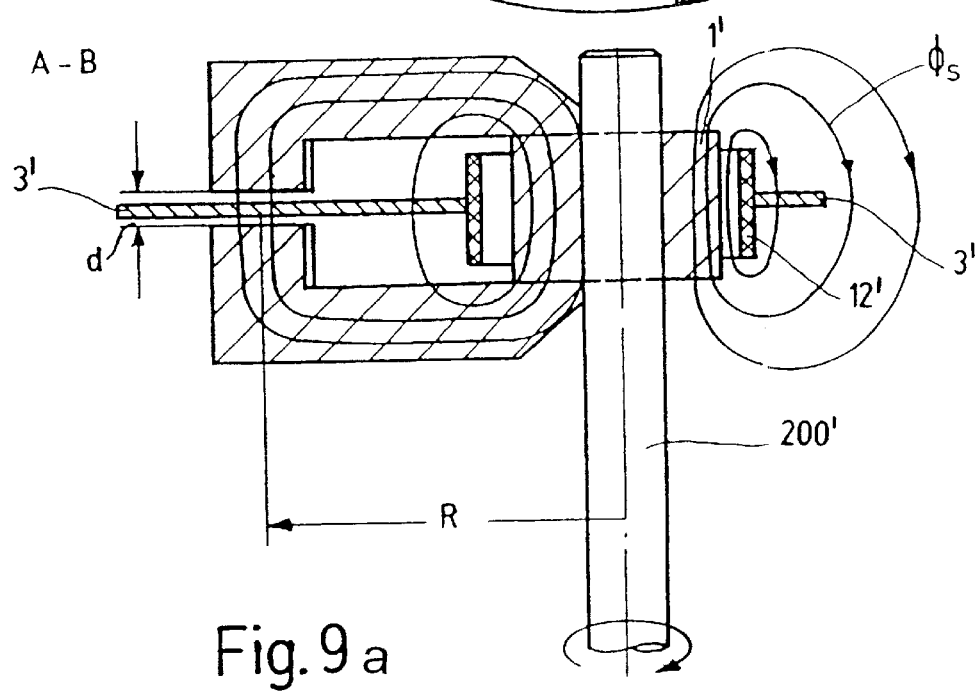

FIGS. 9 and 9a show an angle sensor having an annular coil and measurement core which is fitted at the rotation point, for a measurement range of about 90°. A measurement core 1' comprises two identical ferrite cores which have a yoke comprising the annular center piece, the rectangular web adjacent to it and the annular segments which are adjacent to the latter and are opposite one another with an air gap d. The measurement core 1' is mechanically connected to a shaft 200', whose angle with respect to a stationary measurement element 3' is intended to be measured. The stationary measurement element 3' is located between the two core halves. An electrically conductive track 4' in the form of a conductor loop is formed on a flat mounting board 2' and is connected at the ends to connections 5' and 6'. This conductor loop is produced from circular arcs 7' and 8' as well as the connections between them and to the connections 5' and 6'. A further conductor track 9' in the form of a circular arc is connected to a connection 10'. A resistance layer 11' is applied to the mounting board between the conductor tracks 7' and 9'. An annular coil 12' is likewise arranged on the mounting board 2' and, like the mounting board 2' is arranged between the two core halves of the measurement core 1'.

When an alternating current flows through the coil 12', a magnetic flux is produced which preferably flows through the ferrite core and across the air gap of the measurement core 1'. Thus, in a known manner, it produces a voltage in the conductor loop 4', and this voltage is dependent on angle, is added by the resistance element, and is passed to the connection 10'.

Apart from the intended measurement flux $\Phi_m$, an undesirable stray flux $\Phi_s$ (which is not dependent on angle) occurs, and this consumes additional field power and reduces the wanted signal. In order to keep the stray flux low, this coil is arranged as close as possible to the measurement core and is arranged, for example, as a cylindrical coil. The internal core diameter and the coil diameter must be restricted to the necessary extent.

The coil is connected to electrical connections 13' and 14'. In order to compensate for the inductive reactive currents, a capacitor 15' is connected in parallel with the coil, in a known manner. During operation at a resonant frequency, the amount of current required is only that which is required to cover the tuned-circuit losses.

An error analysis shows that an axis offset is the primary factor leading to measurement errors. Effort should therefore be made to make the ratio between the effective radius R, which the pole shoes of the measurement core describe, and an axis offset which can be assumed to be as large as possible. This can lead to relatively large measurement cores having to be used. If this is not done, increased complexity must be accepted for accurate processing or adjustment.

In order to reduce the error from axis offset, the design may be symmetrical, if the measurement angles are less than 180°. The measurement core then has two limb pairs which are offset through 180°, are supplied from a common annular coil and act on appropriately arranged measurement loops, each having one resistance element.

Figure 11:
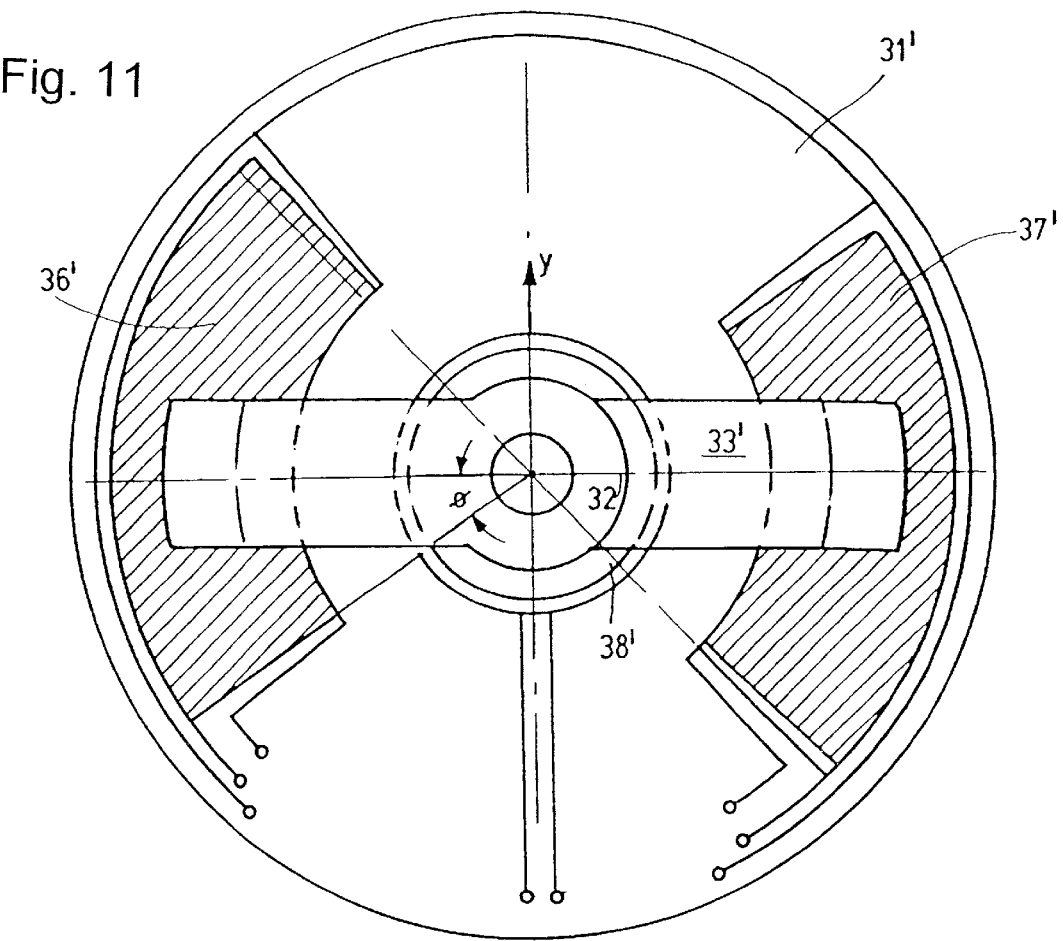
FIGS. 11 and 11a show an angle sensor having a symmetrical design.
Figure 11A:
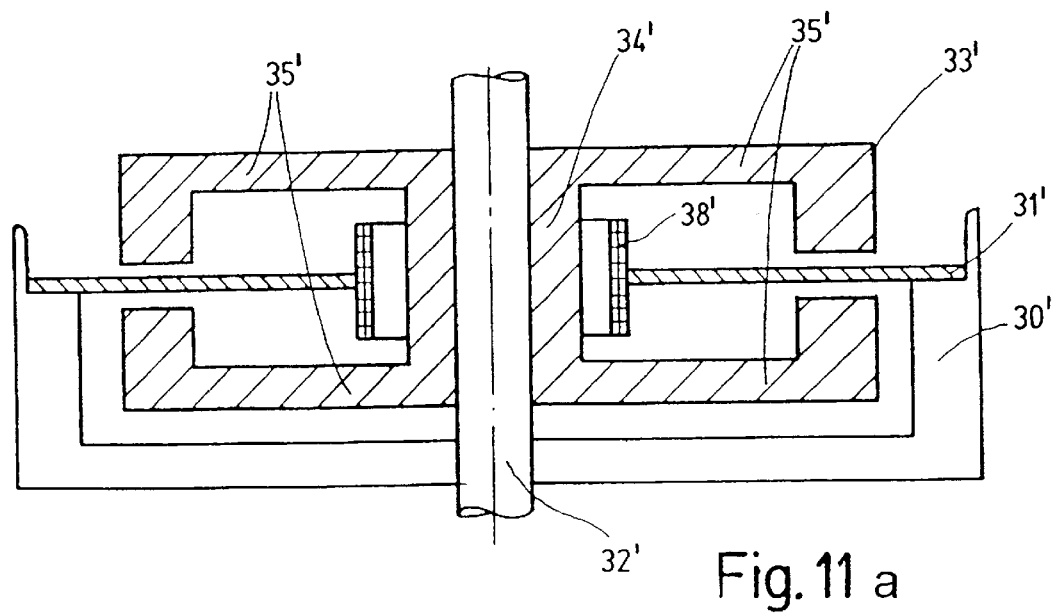

FIGS. 11 and 11a describe such a design. A shaft 32' is mounted in a housing 30' such that it can rotate. A soft-magnetic core 33' is mounted on the shaft 32'. The core 33' comprises a cylindrical center part 34' and, originating from this, four limbs 35' with the limbs each being arranged in pairs at an angle of 180° to one another. The individual limb pairs 35' form an air gap in which a printed circuit board 31' is located.

The printed circuit board 31' is designed in a similar way to the printed circuit board 2' in the embodiment described above in conjunction with FIG. 9. It also has a second arrangement 37' of conductor tracks, resistance elements and electrical connections forming a mirror image of the existing conductor tracks, the resistance layer and electrical connections 36'. An alternating current flows through a field coil 38' and causes a magnetic flux of approximately the same size in the two air gaps. The output voltages of the two resistance elements 36' and 37' are evaluated such that they contribute to the measurement result in the same way. If an axis offset occurs, the output voltage of one part 36' will admittedly have an error. However, this will largely be compensated for by a corresponding opposite error in the other part 37'.

This arrangement allows not only errors resulting from a shift in the printed circuit board with respect to the rotation point but also errors resulting from eccentricity of the rotor or bearing plane to be largely compensated for.

A further advantage is that the symmetric design avoids any unbalance.

For large shaft diameters or large measurement radii R, especially in the case of hollow-shaft sensors, the construction of an angle sensor as described above is generally uneconomic, owing to the large measurement core. Furthermore, owing to the long distance over the circumference of the core, a considerable stray flux occurs, which leads to the wanted signal being reduced.

As an alternative to this, it is possible to use a core in which the ferrite core passes through only a portion of the circle area of the coil. If the core material has high relative permeability, the same voltage will be induced in the measurement loop for the same field current in the coil, air gap area and length. The disadvantage of this arrangement is that a very strong stray flux is formed, which makes it necessary to increase the field power and, furthermore, induces voltages which are independent of angle in the measurement loop.

This disadvantage can largely be overcome by using a short-circuiting ring outside the measurement core to produce an opposite magnetic field, which leads to a reduction in the stray field and reduces the induction of voltages which are independent of angle in the measurement loop.

Figure 10:
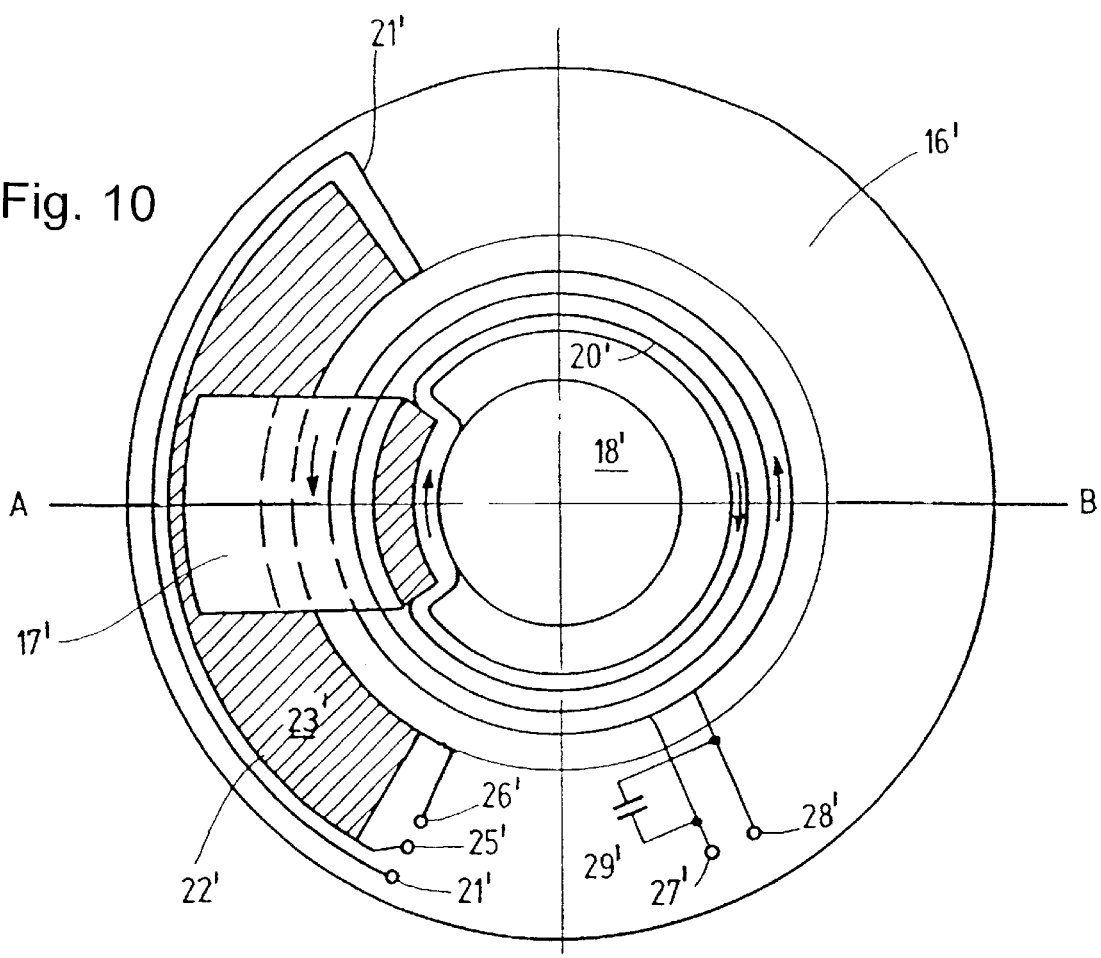
Figure 10:
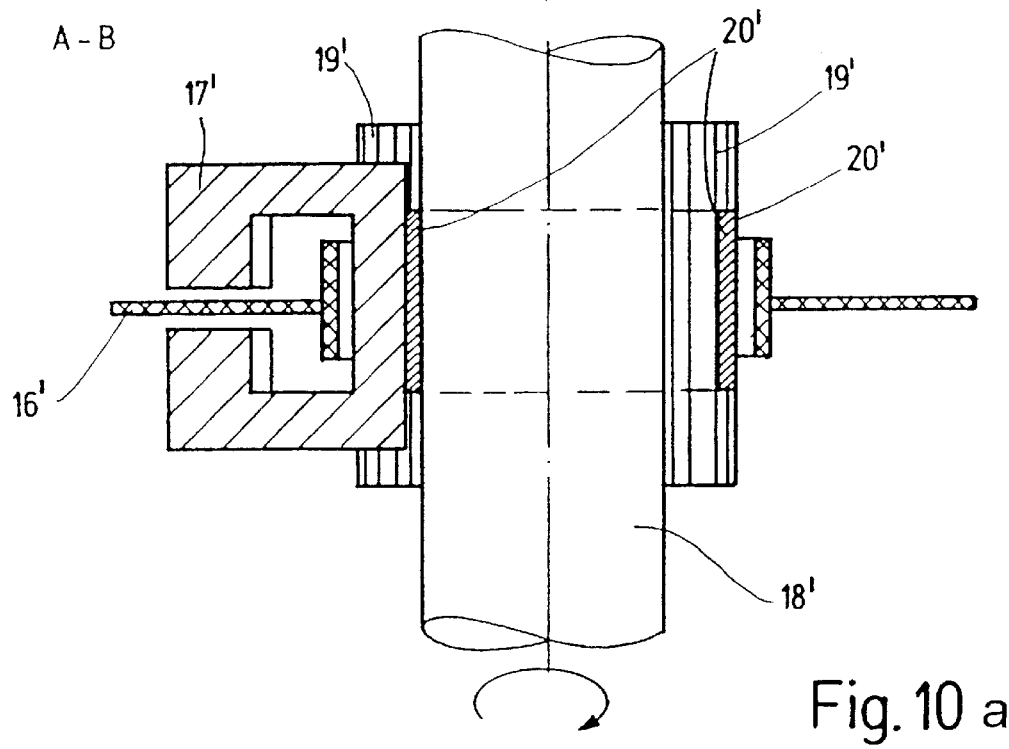

FIGS. 10 and 10a show an exemplary embodiment of this type. A core 17' is mounted on the side of a shaft 18', which has a relatively large diameter, with the aid of a support 19'. The core 17' is composed of soft-magnetic material. It is formed from two identical halves, which each comprise an inner and an outer annular segment and a connecting web in between them, which are connected to one another at the end of the shaft without any air gap. A short-circuiting ring 20' is located between the core and the shaft and rests against the circumference of the supporting body 19' in the region outside the core 17', but passes through between the core 17' and the shaft 18' in the region of the core.

Together with the insides of the outer annular segments of the core 17', this forms an air gap in which the mounting board 16' is located. A cylindrical coil 30' is also arranged on this mounting board 16' and encloses the shaft 18', the supporting body 19', the inner annular segment of the core 17' and a short-circuiting ring 20' with a small gap. A conductor loop 21' with connections 26' and 24', a conductor track 22' with a connection 25', a resistance track 23', coil connections 27' and 28' and a tuned-circuit capacitor 29' are also located on the mounting board 16'. The function of these elements is evident from the description related to FIG. 9, to which reference is made.

Owing to the high relative permeability factor of its material and the short air gap, the core 17' forms a relatively low magnetic reluctance. Thus, when current flows through the coil 20', a magnetic flux is preferably formed through the region of the air gap. Since, however, the coil 20' has a large diameter and, furthermore, the shaft has an undefined magnetic behavior, a disturbing stray field is formed in the absence of the short-circuiting ring 20'. If an alternating current flows through the coil 30', a voltage is induced in the short-circuiting ring 20' and this causes current to flow in the opposite direction to the field current $I_E$. A magnetic field is thus formed which counteracts the magnetic field of the coil, so that the resulting magnetic field is highly attenuated. However, this is not the case in the region of the magnet core 17', since the short-circuiting ring passes round behind the core there.

As described above, a symmetrical design with two cores and a common field coil can also be constructed for measurement angles of less than about 120°, in order to reduce the errors due to axis offsets.

Particularly if the measurement angle ranges are small, it is advantageous to provide a large distance between the rotation point and the resistance element, in order to reduce errors due to axis offsets. If the axis separation is large, the use of field coils and tuned-circuit coils in the form of concentric coils is no longer worthwhile, owing to the large coil diameters and cores required for this purpose.

In this case, it is thus advantageous to use a modified linear distance encoder for short measurement distances. The field coil is in this case fixed and is fed directly from the oscillator. Together with a capacitor, it forms a tuned circuit. The field coil creates flux through the measurement core, which is mechanically connected via an arm to the shaft whose angle with respect to the housing is to be measured. The measurement core in turn passes flux through the already known measurement loop with the resistance layer, thus producing an output signal which is dependent on angle.

Figure 12:
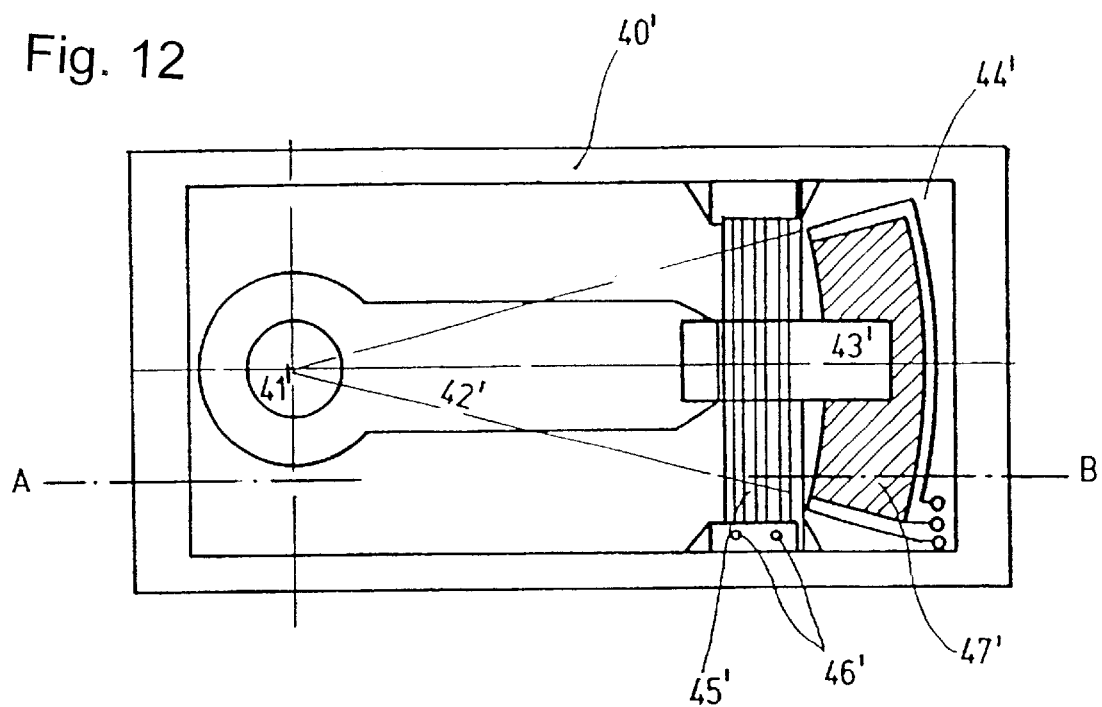
Figure 12:
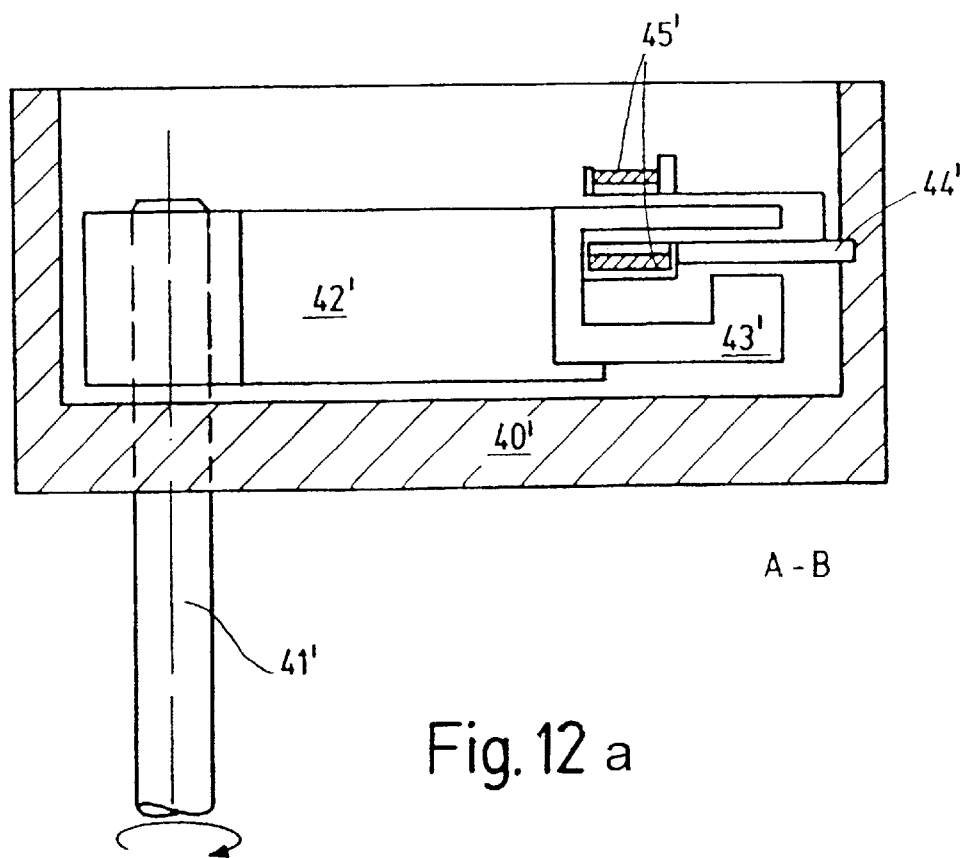

FIGS. 12 and 12a show a schematic illustration of one embodiment of an angle sensor based on the functional principle described above. A shaft 41' is mounted in a housing 40' such that it can rotate. An arm 42' is firmly connected to the shaft. A soft-magnetic core 43' is attached to the end of the arm and describes a circular arc when the shaft rotates. The core 43' forms a rectangle, which is interrupted by an air gap. A coil 45' and a printed circuit 44' are firmly connected to the housing. The coil 45' is arranged such that the straight limb of the measurement core 43' passes through it. The printed circuit board 44' is located in the air gap of the measurement core 43'. In the region which is covered by the air gap of the measurement core in the event of movement beyond the intended measurement range there is a measurement loop 47', which need not be described in any more detail. The coil has a cross section which is as small as possible in order that the stray flux which passes through the measurement loop outside the measurement core remains as small as possible. Furthermore, the winding is designed to be sufficiently flat that it can be passed through the air gap in the core 43'. It is thus possible to use an integral core.

What is claimed is:

1. An inductive measurement transducer for determining a position of a moving body, comprising: a conductor loop over the moving body; a stationary conductor loop which extends uniformly over a measurement length and is fixed with respect to the moving body; an inductively acting element mounted to the moving body to produce an alternating magnetic field which extends essentially at right angles to the conductor loop over the moving body so that the alternating field passes through the stationary conductor loop, a voltage difference between a forward line and a return line of the stationary conductor loop being averaged and passed to an output so that voltage elements are tapped off by individual taps which are distributed over the measurement length on the conductor loop; and one of individual resistors and individual capacitors operatively arranged to carry out the averaging, the one of individual resistors and individual capacitors being connected to a common connection which encloses the region through which the alternating magnetic field of the inductively acting element can flow.

2. A measurement transducer as defined in claim 1, wherein alternating magnetic field of the moving, inductively acting element is produced by arranging a high-permeability core such that it moves in a stationary field coil extending over the length of the measurement distance, which core diverts the magnetic flux into a region of the measurement loop.

3. A measurement transducer as defined in claim 2, and further comprising a transformer having a suitable transformation ratio and a field winding that consists of one turn and matches to an impedance of a supply.

4. A measurement transducer as defined in claim 2, wherein the moveable high-permeability core is provided with a coil which is connected to a capacitor, so that they form a tuned circuit, and excitation takes place at a resonant frequency of the tuned circuit.

5. A measurement transducer as defined in claim 4, wherein the tuned circuit formed by the coil and the capacitor is used as an element to define a frequency of an oscillator circuit.

6. A measurement transducer as defined in claim 1, wherein the inductively acting element has a feed current that is regulated such that the voltage across the complete conductor loop remains constant.

7. A measurement transducer as defined in claim 6, wherein a measured value is formed from a ratio of voltage present at the output to voltage present across the complete conductor loop.

8. A measurement transducer as defined in claim 1, and further comprising additional circuit means for compensating for voltages induced by a stray field outside the moveable inductively acting element.

9. An inductive measurement transducer for determining a position of a moving body, comprising: a conductor loop over the moving body; a stationary conductor loop which extends uniformly over a measurement length and is fixed with respect to the moving body; an inductively acting element mounted on the moving body to produce an alternating magnetic field which extends essentially at right angles to the conductor loop over the moving body so that the alternating field passes through the stationary conductor loop, a voltage difference between a forward line and a return line of the stationary conductor loop being averaged and passed to an output; and a resistance layer located between the forward line of the conductor loop and a measurement connection which extends over the length of the conductor loop and runs parallel for carrying out the averaging, a region between the forward part of the conductor loop and the measurement connection, through which the alternating magnetic field of the inductively acting element can pass, being covered by the resistance layer.

10. A measurement transducer as defined in claim 9, wherein the alternating magnetic field of the moving, inductively acting element is produced by arranging a high-permeability core such that it moves in a stationary field coil extending over the length of the measurement distance, which core diverts the magnetic flux into a region of the measurement loop.

11. A measurement transducer as defined in claim 10, and further comprising a transformer having a suitable transformation ratio and a field winding that consists of one turn and matches to an impedance of a supply.

12. A measurement transducer as defined in claim 10, wherein the moveable high-permeability core is provided with a coil which is connected to a capacitor, so that they form a tuned circuit, and excitation takes place at a resonant frequency of the tuned circuit.

13. A measurement transducer as defined in claim 12, wherein the tuned circuit formed by the coil and the capacitor is used as an element to define a frequency of an oscillator circuit.

14. A measurement transducer as defined in claim 9, wherein the inductively acting element has a feed current that is regulated such that the voltage across the complete conductor loop remains constant.

15. A measurement transducer as defined in claim 14, wherein a measured value is formed from a ratio of voltage present at the output to voltage present across the complete conductor loop.

16. A measurement transducer as defined in claim 9, and further comprising additional circuit means for compensating for voltages induced by a stray field outside the moveable inductively acting element.

17. An inductive measurement transducer for determining a position of a moving body, comprising: an inductively acting element which is connected to the moving body; a conductor loop through which an alternating current passes is passed through the inductively acting element so as to cause an increased voltage drop in a region of the inductively acting element, in which case a voltage drop along the conductor loop in a region outside the inductively acting element is small in comparison with a voltage drop in a region of the inductively active element, a voltage difference between a forward line and a return line of the conductor loop being averaged and passed to an output in that voltage elements are tapped off by individual taps which are distributed over the measurement length on the conductor loop; and one of individual resistors and individual capacitors operatively arranged to carry out the averaging, the one of individual resistors and individual capacitors being connected to a common connection which encloses the region through which the alternating magnetic field of the moving, inductively acting element can flow.

18. A measurement transducer as defined in claim 17, wherein the alternating magnetic field of the moving, inductively acting element is produced by arranging a high-permeability core such that it moves in a stationary field coil extending over the length of the measurement distance, which core diverts the magnetic flux into a region of the measurement loop.

19. A measurement transducer as defined in claim 18, and further comprising a transformer having a suitable transformation ratio and a field winding that consists of one turn and matches to an impedance of a supply.

20. A measurement transducer as defined in claim 18, wherein the moveable high-permeability core is provided with a coil which is connected to a capacitor, so that they form a tuned circuit, and excitation takes place at a resonant frequency of the tuned circuit.

21. A measurement transducer as defined in claim 20, wherein the tuned circuit formed by the coil and the capacitor is used as an element to define a frequency of an oscillator circuit.

22. A measurement transducer as defined in claim 17, wherein the inductively acting element has a feed current that is regulated such that the voltage across the complete conductor loop remains constant.

23. A measurement transducer as defined in claim 22, wherein a measured value is formed from a ratio of voltage present at the output to voltage present across the complete conductor loop.

24. A measurement transducer as defined in claim 17, and further comprising additional circuit means for compensating for voltages induced by a stray field outside the moveable inductively acting element.

25. An inductive measurement transducer for determining a position of a moving body, comprising: an inductively acting element connected to the moving body; a conductor loop through which an alternating current passes is passed through the inductively acting element so as to cause an increased voltage drop in a region of the inductively acting element, in which case a voltage drop along the conductor loop in a region outside the inductively acting element is small in comparison with a voltage drop in a region of the inductively active element, a voltage difference between a forward line and a return line of the conductor loop being averaged and passed to an output; a resistance layer for carrying out the averaging located between the forward part of the conductor loop and a measurement connection so as to extend over the length of the conductor loop and run parallel, a region between the forward part of the conductor loop and the measurement connection, through which the alternating magnetic field of the inductively active element can pass, being covered by the resistance layer.

26. A measurement transducer as defined in claim 25, wherein the alternating magnetic field of the moving, inductively acting element is produced by arranging a high-permeability core such that it moves in a stationary field coil extending over the length of the measurement distance, which core diverts the magnetic flux into a region of the measurement loop.

27. A measurement transducer as defined in claim 26, and further comprising a transformer having a suitable transformation ratio and a field winding that consists of one turn and matches to an impedance of a supply.

28. A measurement transducer as defined in claim 26, wherein the moveable high-permeability core is provided with a coil which is connected to a capacitor, so that they form a tuned circuit, and excitation takes place at a resonant frequency of the tuned circuit.

29. A measurement transducer as defined in claim 28, wherein the tuned circuit formed by the coil and the capacitor is used as an element to define a frequency of an oscillator circuit.

30. A measurement transducer as defined in claim 25, wherein the inductively acting element has a feed current that is regulated such that the voltage across the complete conductor loop remains constant.

31. A measurement transducer as defined in claim 30, wherein a measured value is formed from of ratio of voltage present at the output to voltage present across the complete conductor loop.

32. A measurement transducer as defined in claim 25, and further comprising additional circuit means for compensating for voltages induced by a stray field outside the moveable inductively acting element.

33. An arrangement for measuring rotation angles of a shaft on which a measurement transducer is mounted, the measurement transducer including a conductor loop over a moving body, a stationary conductor loop which extends over a measurement length and is fixed with respect to the moving body, an inductively acting element mounted to the moving body to produce an alternating magnetic field which extends essentially at right angles to the conductor loop over the moving body so that the alternating field passes through the stationary conductor loop, a voltage difference between a forward line and a return line of the stationary conductor loop being averaged and passed to an output so that voltage elements are tapped off by individual taps which are distributed over the measurement length on the conductor loop, and one of individual resistors and individual capacitors operatively arranged to carry out the averaging, the one of individual resistors and individual capacitors being connected to a common connection which encloses the region through which the alternating magnetic field of the inductively acting element can flow, the inductively acting element comprises a soft-magnetic core which is arranged away from a rotation point and, together with an air gap which interrupts it, forms a magnetic circuit, wherein a coil which is concentric with respect to the rotation point is arranged such that an alternating current flowing through it causes a magnetic flux through the air gap, the air gap containing a mounting board which has at least one measurement loop in which the magnetic field in the air gap produces at least one angle-dependent voltage, by induction, the air gap being formed by two limbs and containing a printing circuit board which has at least one measurement loop in which the magnetic field in the air gap produces at least one angle-dependent voltage, by induction.

34. An arrangement for measuring rotation angles as defined in claim 33, wherein at least two inductively active elements, distributed uniformly over a circumference, and associated measurement loops are provided, output voltages of these measurement loops being used in the same way to obtain the measured value.

35. An arrangement for measuring rotation angles of a shaft on which an inductive measurement transducer is mounted, the measurement transducer including a conductor loop over a moving body, a stationary conductor loop which extends over a measurement length and is fixed with respect to the moving body, an inductively acting element mounted to the moving body to produce an alternating magnetic field which extends essentially at right angles to the conductor loop over the moving body so that the alternating field passes through the stationary conductor loop, a voltage difference between a forward line and a return line of the stationary conductor loop being averaged and passed to an output so that voltage elements are tapped off by individual taps which are distributed over the measurement length on the conductor loop, and one of individual resistors and individual capacitors operatively arranged to carry out the averaging, the one of individual resistors and individual capacitors being connected to a common connection which encloses the region through which the alternating magnetic field of the inductively acting element can flow, the inductively acting element comprises a soft-magnetic core which is arranged away from a rotation point and, together with an air gap which interrupts it, forms a magnetic circuit, wherein a coil which is concentric with respect to the rotation point is arranged such that an alternating current flowing through it causes a magnetic flux through the air gap, the air gap containing a mounting board which has at least one measurement loop in which the magnetic field in the air gap produces at least one angle-dependent voltage, by induction, electrically highly conductive material being arranged at least one of above, below and at an edge of the coil such that short-circuit currents flowing in it largely cancel out magnetic flux outside the inductive transmitter element.

36. An arrangement for measuring rotation angles as defined in claim 35, wherein at least two inductively active elements, distributed uniformly over a circumference, and associated measurement loops are provided, output voltages of these measurement loops being used in the same way to obtain the measured value.

37. An arrangement for measuring rotation angles of a shaft on which a measurement transducer is mounted, the measurement transducer including a conductor loop over a moving body, a stationary conductor loop which extends over a measurement length and is fixed with respect to the moving body, an inductively acting element mounted on the moving body to produce an alternating magnetic field which extends essentially at right angles to the conductor loop over the moving body so that the alternating field passes through the stationary conductor loop, a voltage difference between a forward line and a return line of the stationary conductor loop being averaged and passed to an output, and a resistance layer located between the forward line of the conductor loop and a measurement connection which extends over the length of the conductor loop and runs parallel for carrying out the averaging, a region between the forward part of the conductor loop and the measurement connection, through which the alternating magnetic field of the inductively acting element can pass, being covered by the resistance layer, the inductively acting element comprises a soft-magnetic core which is arranged away from a rotation point and, together with an air gap which interrupts it, forms a magnetic circuit, wherein a coil which is concentric with respect to the rotation point is arranged such that an alternating current flowing through it causes a magnetic flux through the air gap, the air gap containing a mounting board which has at least one measurement loop in which the magnetic field in the air gap produces at least one angle-dependent voltage, by induction, the air gap being formed by two limbs and containing a printing circuit board which has at least one measurement loop in which the magnetic field in the air gap produces at least one angle-dependent voltage, by induction.

38. An arrangement for measuring rotation angles of a shaft on which an inductive measurement transducer is mounted, the measurement transducer including a conductor loop over a moving body, a stationary conductor loop which extends over a measurement length and is fixed with respect to the moving body, an inductively acting element mounted on the moving body to produce an alternating magnetic field which extends essentially at right angles to the conductor loop over the moving body so that the alternating field passes through the stationary conductor loop, a voltage difference between a forward line and a return line of the stationary conductor loop being averaged and passed to an output, and a resistance layer located between the forward line of the conductor loop and a measurement connection which extends over the length of the conductor loop and runs parallel for carrying out the average line, a region between the forward part of the conductor loop and the measurement connection, through which the alternating magnetic field of the inductively acting element can pass, being covered by the resistance layer, the inductively acting element comprises a soft-magnetic core which is arranged away from a rotation point and, together with an air gap which interrupts it, forms a magnetic circuit, wherein a coil which is concentric with respect to the rotation point is arranged such that an alternating current flowing through it causes a magnetic flux through the air gap, the air gap containing a mounting board which has at least one measurement loop in which the magnetic field in the air gap produces at least one angle-dependent voltage, by induction, electrically highly conductive material being arranged at least one of above, below and at an edge of the coil such that short-circuit currents flowing in it largely cancel out magnetic flux outside the inductive transmitter element.

39. An arrangement for measuring rotation angles of a shaft on which an inductive measurement transducer is mounted, the transducer including a conductor loop over a moving body, a stationary conductor loop which extends over the measurement length and is fixed with respect to the moving body, an inductively acting element mounted to the moving body to produce an alternating magnetic field which extends essentially at right angles to the conductor loop over the moving body so that the alternating field passes through the stationary conductor loop, a voltage difference between a forward line and a return line of the stationary conductor loop being averaged and passed to an output so that voltage elements are tapped off by individual taps which are distributed over the measurement length on the conductor loop, and one of individual resistors and individual capacitors operatively arranged to carry out the averaging, the one of individual resistors and individual capacitors being connected to a common connection which encloses the region through which the alternating magnetic field of the inductively acting element can flow, the inductively acting element being arranged away from a rotation point, the inductively acting element comprising a soft-magnetic core interrupted by an air gap, wherein a coil is provided, which is mechanically connected to a housing and has an opening through which one limb of the core is passed and allows the shaft to move over the intended angle range without the inductively acting element touching the coil and through which alternating current flows, a mounting board being arranged in the air gap of the inductively acting element, which mounting board has at least one measurement loop for obtaining the measurement voltage.

40. An arrangement for measuring rotation angles of a shaft on which an inductive measurement transducer is mounted, the transducer including a conductor loop over a moving body, a stationary conductor loop which extends over a measurement length and is fixed with respect to the moving body, an inductively acting element mounted on the moving body to produce an alternating magnetic field which extends essentially at right angles to the conductor loop over the moving body so that the alternating field passes through the stationary conductor loop, a voltage difference between a forward line and a return line of the stationary conductor loop being averaged and passed to an output; and a resistance layer located between the forward line of the conductor loop and a measurement connection which extends over the length of the conductor loop and runs parallel for carrying out the averaging, a region between the forward part of the conductor loop and the measurement connection, through which the alternating magnetic field of the inductively acting element can pass, being covered by the resistance layer, the inductively acting element being arranged away from a rotation point, the inductively acting element comprising a soft-magnetic core interrupted by an air gap, wherein a coil is provided, which is mechanically connected to a housing and has an opening through which one limb of the core is passed and allows the shaft to move over the intended angle range without the inductively acting element touching the coil and through which alternating current flows, a mounting board being arranged in the air gap of the inductively acting element, which mounting board has at least one measurement loop for obtaining the measurement voltage.

* * * * *